US009406916B2

(12) United States Patent
Kim et al.

(10) Patent No.: US 9,406,916 B2
(45) Date of Patent: Aug. 2, 2016

(54) BATTERY MODULE

(75) Inventors: Myung-Chul Kim, Yongin-si (KR); Hee-Joon Jin, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 671 days.

(21) Appl. No.: 13/402,242

(22) Filed: Feb. 22, 2012

(65) Prior Publication Data

US 2013/0084480 A1    Apr. 4, 2013

(30) Foreign Application Priority Data

Sep. 30, 2011    (KR) ................ 10-2011-0099766

(51) Int. Cl.
| | |
|---|---|
| *H01M 2/10* | (2006.01) |
| *H01M 2/20* | (2006.01) |
| *H01M 10/625* | (2014.01) |
| *H01M 10/647* | (2014.01) |
| *H01M 10/6566* | (2014.01) |
| *H01M 10/613* | (2014.01) |

(52) U.S. Cl.
CPC ............ *H01M 2/1072* (2013.01); *H01M 2/206* (2013.01); *H01M 10/613* (2015.04); *H01M 10/625* (2015.04); *H01M 10/647* (2015.04); *H01M 10/6566* (2015.04)

(58) Field of Classification Search
CPC .............. H01M 2/1072; H01M 2/206; H01M 10/5004; H01M 10/5016; H01M 10/5032; H01M 10/5073; H01M 10/6566; H01M 10/647; H01M 10/625; H01M 10/613

USPC ..................................................... 429/96, 99
See application file for complete search history.

(56) References Cited

U.S. PATENT DOCUMENTS

| | | | | |
|---|---|---|---|---|
| 4,487,096 | A | * | 12/1984 | Randall ......................... 81/124.2 |
| 6,211,646 | B1 | * | 4/2001 | Kouzu et al. .................. 320/107 |
| 2005/0287427 | A1 | * | 12/2005 | Kim et al. ...................... 429/158 |
| 2007/0278915 | A1 | | 12/2007 | Conrardy et al. |

(Continued)

FOREIGN PATENT DOCUMENTS

| | | |
|---|---|---|
| EP | 2 450 980 A2 | 5/2012 |
| JP | 2001-035450 A | 2/2001 |

(Continued)

OTHER PUBLICATIONS

European Search Report dated Aug. 7, 2012 for EP 12168618.2. (Kim, et al.).

(Continued)

*Primary Examiner* — Patrick Ryan
*Assistant Examiner* — Aaron Greso
(74) *Attorney, Agent, or Firm* — Lee & Morse, P.C.

(57) ABSTRACT

A battery module includes first and second plates opposite each other, first and second frames respectively connecting tops and bottoms of the first and second plates to define a casing, the first frame being connected to the second frame and having a shape corresponding to the second frame, and a plurality of battery cells stacked in the casing, each battery cell including a first surface with a terminal portion, the first surface of each battery cell facing the first plate, a second surface opposite the first surface, and a pair of third surfaces spaced part from each other, each third surface connecting the first and second surfaces and being parallel to the second frame.

19 Claims, 6 Drawing Sheets

(56) References Cited

U.S. PATENT DOCUMENTS

| | | | |
|---|---|---|---|
| 2010/0021802 A1* | 1/2010 | Yang | H01M 2/0212 429/91 |
| 2010/0116570 A1 | 5/2010 | Sugawara et al. | |
| 2010/0136420 A1* | 6/2010 | Shin | H01M 2/1077 429/178 |
| 2010/0151307 A1* | 6/2010 | Naganuma | 429/99 |
| 2011/0165451 A1 | 7/2011 | Kim et al. | |
| 2011/0206948 A1 | 8/2011 | Asai et al. | |
| 2012/0115016 A1 | 5/2012 | Kim | |
| 2012/0231320 A1 | 9/2012 | Heck et al. | |

FOREIGN PATENT DOCUMENTS

| | | |
|---|---|---|
| KR | 10-2007-0105114 A | 10/2007 |
| WO | WO 2011/038908 A1 | 4/2011 |

OTHER PUBLICATIONS

European Office action dated Jul. 16, 2015 for EP 12 168 618.2. (Kim, et al.).

* cited by examiner

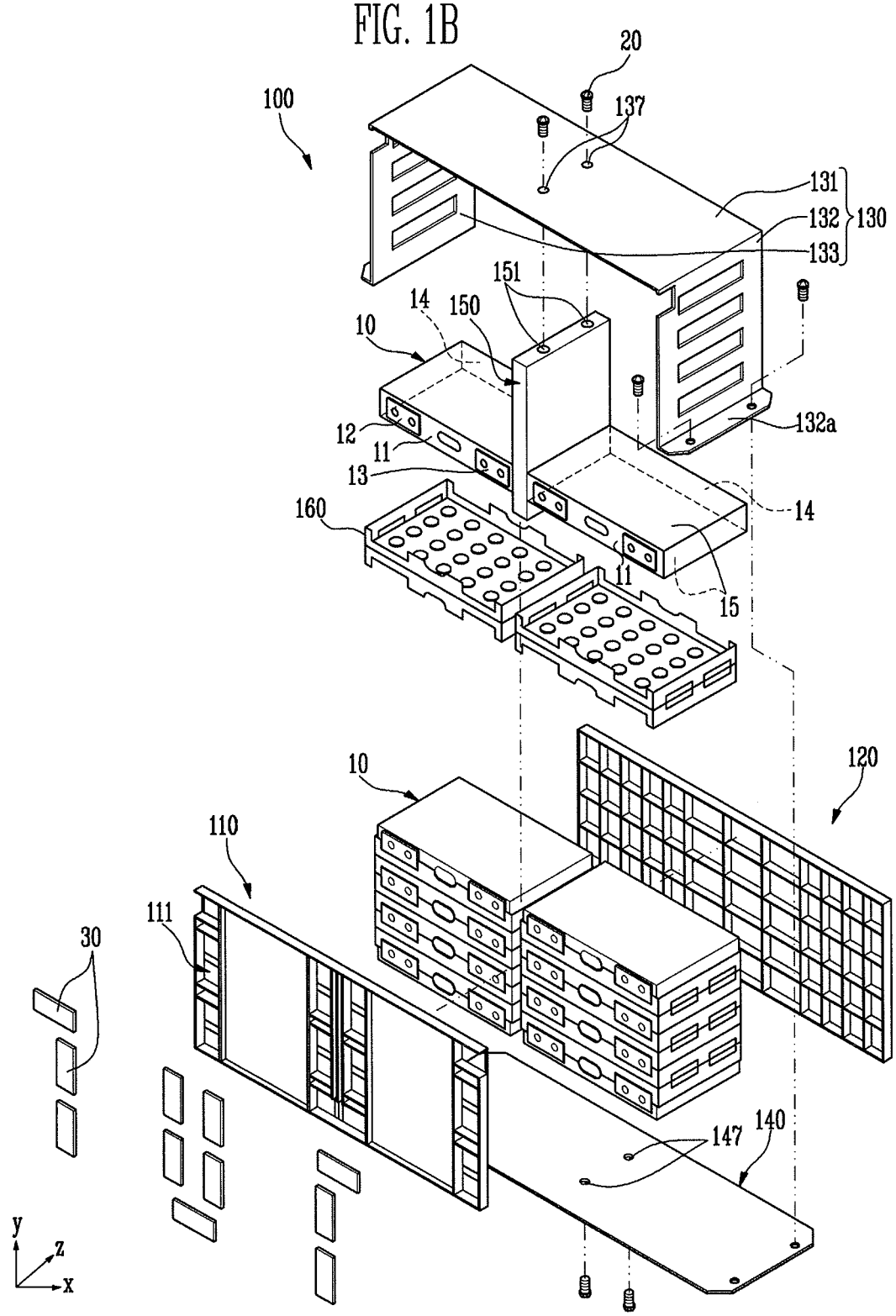

BATTERY MODULE

BACKGROUND

1. Field

An aspect of example embodiments relates to a battery module, and more particularly, to a battery module provided with a new structure including a plurality of battery cells.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

As devices using the large-capacity battery module have various external appearances, it may be required that the shape of the battery module is varied in accordance with the various external appearances. For example, demand for a light, small-sized, and safe battery module has increased.

SUMMARY

Embodiments provide a battery module having a new structure with a small size and a light in weight.

According to an aspect of the example embodiments, there is provided a battery module, first and second plates opposite each other, first and second frames respectively connecting tops and bottoms of the first and second plates to define a casing, the first frame being connected to the second frame and having a shape corresponding to the second frame, and a plurality of battery cells stacked in the casing, each battery cell including a first surface with a terminal portion, the first surface of each battery cell facing the first plate, a second surface opposite the first surface, and a pair of third surfaces spaced part from each other, each third surface connecting the first and second surfaces and being parallel to the second frame.

The plurality of battery cells may be stacked on top of each other to define a plurality of cell arrays in the casing, adjacent cell arrays being parallel to each other.

The adjacent cell arrays may have equal heights.

The battery module may further include a support member between the adjacent cell arrays, the support member contacting the first and second frames.

The support member may include first and second fastening portions in portions contacting the first and second frames, respectively, and the first and second frames includes third and fourth fastening portions, respectively, the third and fourth fastening portions being fastened to the first and second fastening portions, respectively.

The first plate may include at least one terminal through-hole overlapping at least a portion of the terminal portion of the battery cell.

The terminal portion may include negative and positive electrode terminals, adjacent electrode terminals extending through the through-holes and being electrically connected to each other by a bus-bar.

The first frame may include a base portion having a shape corresponding to the second frame, and first and second side portions extending from opposite ends of the base portion toward the second frame.

At least one of the first and second frames may include a plurality of protruding portions, the protruding portions having a stripe shape.

Each of the first and second side portions of the first frame may include a bending portion at a terminal edge thereof, each bending portion being bent with respect to a respective side portion and being connected to the second frame.

At least one of the first and second side portions may include at least two bridges extending from an edge of the base portion toward the second frame, the bridges being spaced part from each other.

At least one of the first and second side portions may have a plate shape with an opening therein.

The opening portion may have one or more holes spaced apart from each other along a length direction of the first and second side portions.

The battery module may further include a barrier between the stacked battery cells, the opening portion overlapping the barrier.

The first frame may have a cross-section of "Π".

BRIEF DESCRIPTION OF THE DRAWINGS

Features will become apparent to those of ordinary skill in the art by describing in detail exemplary embodiments with reference to the attached drawings, in which:

FIG. 1B illustrates a detailed, exploded perspective view of FIG. 1A.

DETAILED DESCRIPTION

Figure 1A:
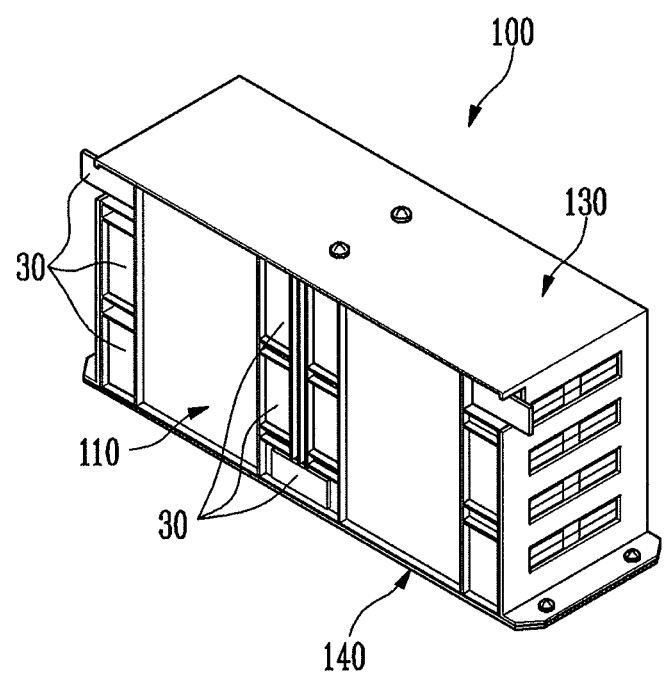
FIG. 1A illustrates a perspective view of a battery module according to an embodiment.

Korean Patent Application No. 10-2011-0099766, filed on Sep. 30, 2011, in the Korean Intellectual Property Office, and entitled: "Battery Module" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or element, or intervening layers/elements may also be present. Further, it will be understood that when a layer or element is referred to as being "connected to" another layer or element, it can be directly connected to the other layer/element, or one or more intervening layers/elements may also be present. In addition, it will also be understood that when a layer or element is referred to as being "between" two layers or elements, it can be the only layer/ element between the two layers/elements, or one or more intervening layers/elements may also be present. Like reference numerals refer to like elements throughout.

FIG. 1A is a perspective view of a battery module according to an embodiment. FIG. 1B is an exploded perspective view of FIG. 1A.

Referring to FIGS. 1A and 1B, a battery module 100 according to an example embodiment may include first and second plates 110 and 120 provided opposite to each other, first and second frames 130 and 140 that respectively connect tops and bottoms of the first and second plates 110 and 120 to define a polyhedral casing, e.g., a casing having a shape of right prism, and a plurality of battery cells 10 in the defined casing. As illustrated in FIG. 1B, each battery cell 10 may have a first surface 11 provided with terminal portions 12 and 13, a second surface 14 provided opposite to the first surface 11, and third surfaces 15, e.g., a pair of wide parallel surfaces, connecting the first and second surfaces 11 and 14. The first frame 130 may be connected to the second frame 140, and may have a surface provided to correspond to the second frame 140. For example, the battery cells 10 may be stacked in one direction on the second frame 140, so that the first surfaces 11 of the battery cells 10 may face the first plate 110 and third surfaces 15 of the battery cells 10 may face the second frame 140.

Figure 2:
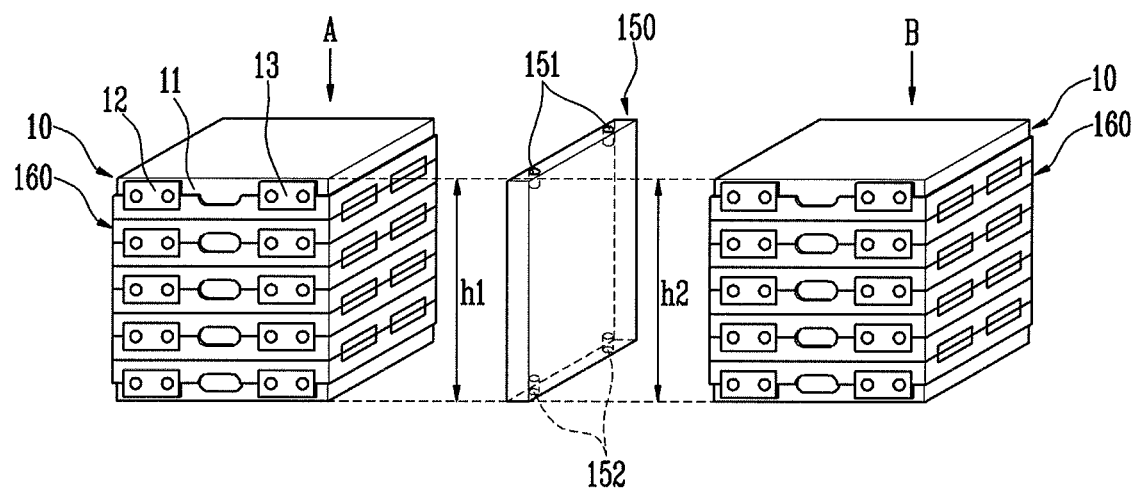
FIG. 2 illustrates a perspective view of a cell array according to an embodiment.

FIG. 2 is a perspective view of a cell array according to an embodiment. Referring to FIGS. 1B and 2, the battery cells 10 may be stacked on the second frame 140 into cell arrays, e.g., cell array A and cell array B in FIG. 2.

The battery cell 10 may be manufactured by accommodating an electrode assembly and an electrolyte in a battery case. The battery case may include the opposite first and second surfaces 11 and 14, with the pair of third surfaces 15 connecting therebetween to form a sealed case. For example, the first surface 11 may include a cap assembly with the terminal portions 12 and 13, so positive and negative electrode terminals of the electrode assembly may be connected to the respective positive and negative terminal portions 12 and 13 in the first surface 11. Electrochemical energy generated inside of the battery cell 10 may be transferred outside the battery cell 10 through the positive and negative electrode terminals.

Referring back to FIG. 2, the cell arrays A and B may be formed by stacking the plurality of battery cells 10 on top of each other, e.g., the battery cells 10 may be arranged to have their third surfaces 15 face each other to form a bundle of stacked battery cells 10. A barrier 160 for spacing apart neighboring battery cells 10 from each other, e.g., along the vertical direction, may be interposed between the stacked battery cells 10, so the third surfaces 15 of adjacent battery cells 10 may not contact each other. The barrier 160 may act as a passage for a heat exchanging medium by providing a space between the stacked battery cells 10.

Referring to FIG. 2, the cell arrays A and B and may be adjacent to each other along a horizontal direction, e.g., along the x-axis, and may be aligned to be parallel to each other, e.g., along a vertical and/or horizontal direction. The neighboring cell arrays A and B may be provided to have heights h1 and h2 corresponding to each other. The plurality of battery cells 10 may be manufactured to have similar shapes, and the barrier 160 interposed between the battery cells 10 may also be standardized and manufactured. For example, each of the cell arrays A and B may include five battery cells 10 stacked on top of each other.

A support member 150 may be provided between adjacent cell arrays, e.g., between neighboring cell arrays A and B in the x-axis. For example, the support member 150 may extend along a vertical direction, e.g., along the y-axis, to a same height as each of the cell arrays A and B, and may contact the first and second frames 130 and 140. For example, the support member 150 may be formed of a non-conductive material, e.g., plastic, and may be interposed between the first and second cell arrays A and B so as to prevent a short circuit between the cell arrays A and B. The support member 150 may contact the first and second frames 130 and 140, e.g., extend from the first frame 130 to the second frame 140, so as to support the first frame 130. Thus, it may be possible to prevent the first frame 130 from drooping.

The support member 150 may include first and second fastening portions 151 and 152 respectively formed at portions coming in contact with the first and second frames 130 and 140. In addition, third and fourth fastening portions 137 and 147 may be provided to correspond to the first and second fastening portions 151 and 152 in the first and second frames 130 and 140, respectively.

The first and second fastening members 151 and 152 may be connected to the third and fourth fastening portions 137 and 147 so as to form passages, respectively. Thus, the support member 150 may be fastened to the first and second frames 130 and 140 by separate fastening members 20. For example, the fastening member 20 may be a bolt, stud, or the like. The first and second fastening portions 151 and 152 and the third and fourth fastening portions 137 and 147 may be fastened to each other by the fastening members 20, so that the support member 150 may be firmly fixed to the first and second frames 130 and 140. Thus, the support member 150 may maintain a space between the first and second frames 130 and 140, and may maintain the shape of the battery module 100. Accordingly, it may be possible to improve the lifetime and safety of the battery module 100.

Figure 3:
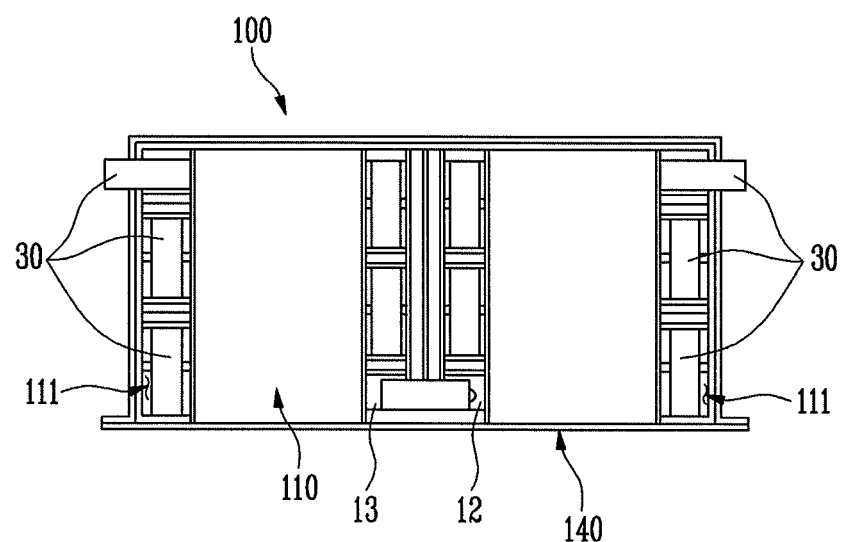
FIG. 3 illustrates a side view of a battery module according to an embodiment.

FIG. 3 is a side view of the battery module 100. Referring to FIGS. 1B and 3, the first plate 110 may include one or more terminal through-holes 111 provided to correspond to at least portions of the terminal portions 12 and 13.

In detail, the battery module 100 my include the first and second plates 110 and 120 opposite to each other, so the plurality of battery cells 10 may be provided between the first and second plates 110 and 120. The battery cells 10 may be stacked so that the first surfaces 11 may face the first plate 110. The terminal portions 12 and 13 may be provided in the first surface 11. The negative and positive electrode terminals in the battery cells 10 may extend through respective terminals portions 12 and 13 to be exposed through respective terminal through-holes 111, and may be electrically connected to terminals of adjacent battery cells 10 through busbar 30.

Figure 4A:
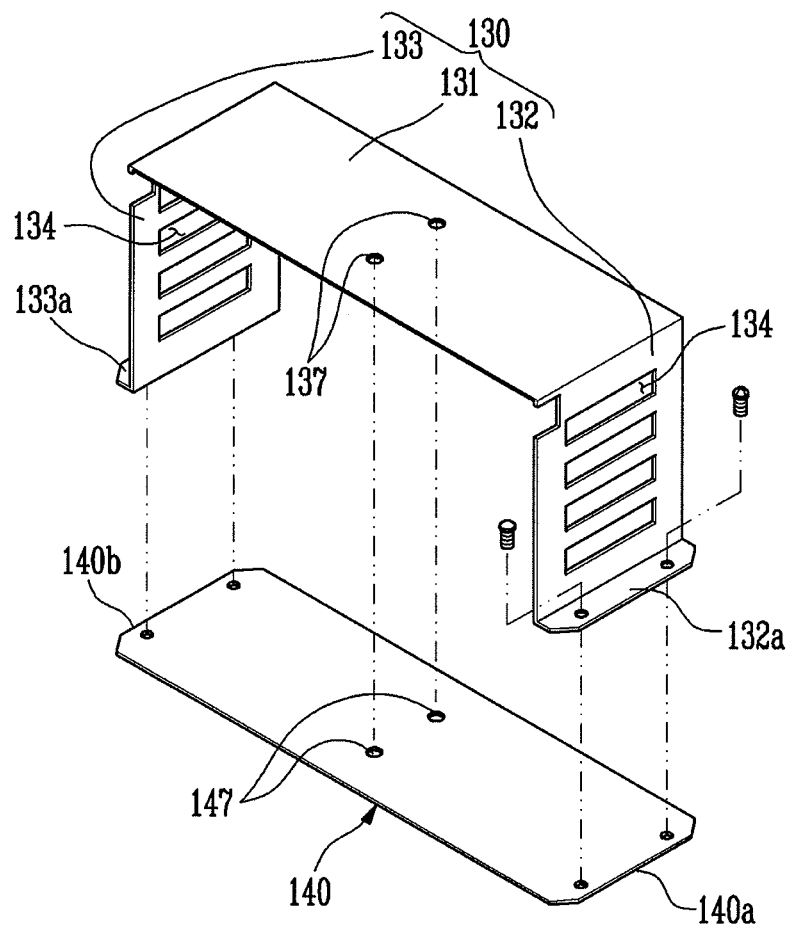
FIG. 4A illustrates an exploded perspective view of first and second frames in a battery module according to an embodiment.
Figure 4B:
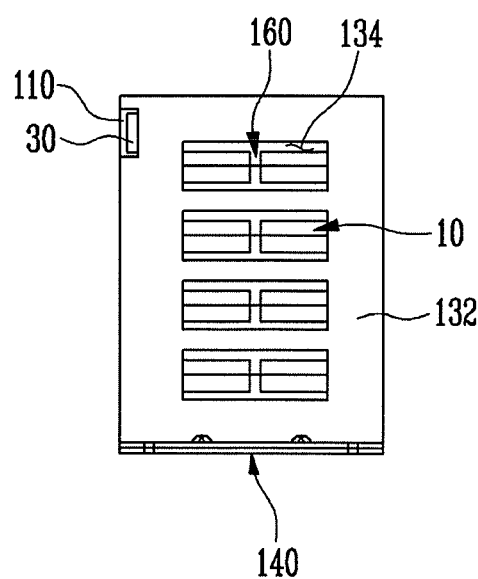
FIG. 4B illustrates a front view of a battery module according to an embodiment.

FIG. 4A is a perspective view of the first and second frames 130 and 140 according to an embodiment. FIG. 4B is a front view of the battery module 100 according to an embodiment.

Referring to FIGS. 4A and 4B, the second frame 140 may function, e.g., as a bottom surface, and the first frame 130 may be provided to surround the plurality of battery cells 10 stacked in the one direction on the second frame 140. For example, the first frame 130 may have a horizontal portion between two vertical portions arranged to have a cross-sectional shape of "Π". As such, the vertical portions of the first frame 130 may be attached to the second frame 140 to define a polygonal, e.g., rectangular, frame surrounding the plurality of battery cells 10. That is, as illustrated in FIG. 4A, the first frame 130 may include a base portion 131, i.e., the horizontal portion, that faces the third surfaces 15 of the battery cells 10, and first and second side portions 132 and 133, i.e., the vertical portions, extended, e.g., perpendicularly, from opposite ends of the base portion 131 in a same direction. The base portion 131 may be provided to have a shape corresponding to the second frame 140 so as to be opposite to the second frame 140. The first and second side portions 132 and 133 may be connected to the second frame 140 so that the plurality of stacked battery cells 10 may be firmly fixed.

Each of the first and second side portions 132 and 133 may be formed in a plate shape having an opening portion 134. The opening portion 134 may include one or more holes spaced apart in the length direction of the first and second side portions 132 and 133. The battery module 100 according to this embodiment may include the barrier 160 interposed between the stacked battery cells 10, and the opening portion 134 may be provided to correspond to the barrier 160.

First and second bending portions 132a and 133a bent to outsides may be further provided at ends of the first and second side portions 132 and 133, respectively. The first and second bending portions 132a and 133a may be connected to one and the other ends of the second frame 140, respectively. For example, one or more holes may be provided at positions corresponding to each other in the first and second bending portions 132a and 133a and the one and the other ends 140a and 140b of the second frame 140. The fastening member may include a bolt and the like. The first and second bending portions 132a and 133a and the one and the other ends of the second frame 140 may be fastened to each other by passing the fastening member through the hole.

The battery cell 10 may generate heat in a plurality of charging/discharging processes. The heat may promote deterioration of the battery cell 10 and may cause a problem of safety. Accordingly, a heat exchanging medium may be used to cool down the battery cell 10. In order to efficiently use the heat exchanging medium, a space between the neighboring battery cells 10 may be provided by the barrier 160. The opening portion 134 in each of the side portions 132 and 133 may correspond to, e.g., overlap, the barrier 160, so the heat exchanging efficiency of the heat exchanging medium may be improved. The heat exchanging medium may be supplied to the inside of the battery module 100 through the opening portion 134 of the first side portion 132. In this instance, the opening portion 134 may be provided to correspond to the barrier 160, so that the heat exchanging medium can efficiently pass between the battery cells 10 and be then discharged through the opening portion 134 of the second side portion 133.

Hereinafter, other example embodiments will be described with reference to FIGS. 5 and 6. Detailed descriptions of same elements described previously with reference to FIGS. 1 to 4 will not be repeated.

Figure 5:
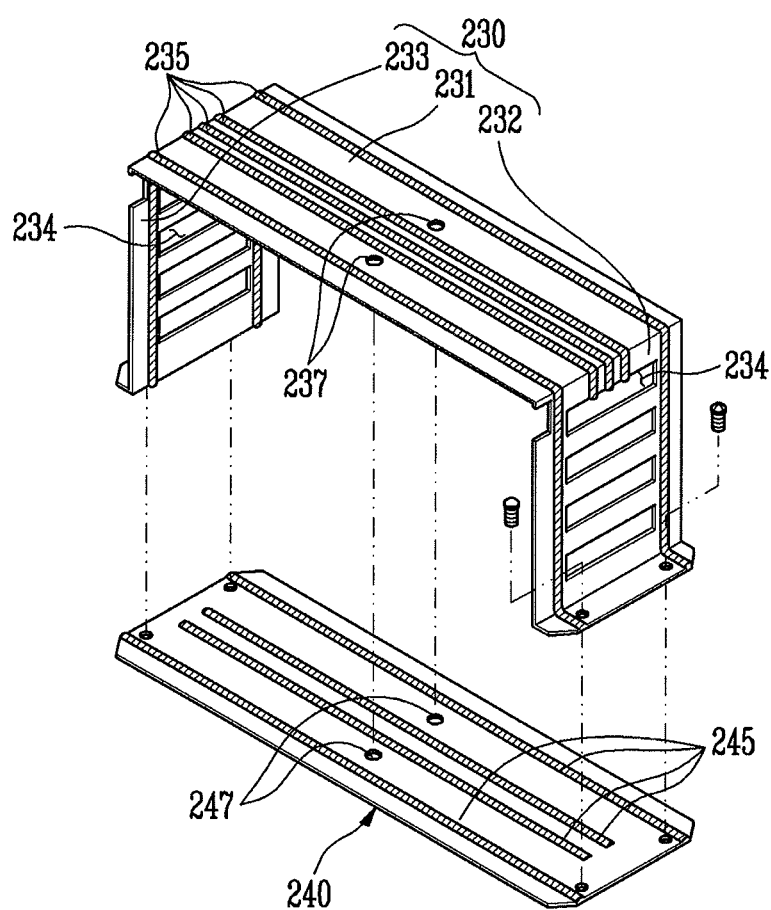
FIG. 5 illustrates a perspective view of first and second frames in a battery module according to another embodiment.

FIG. 5 is a perspective view of first and second frames in a battery module according to another embodiment. Referring to FIG. 5, a battery module according to this embodiment may include a second frame 240 for supporting a plurality of battery cells, and a first frame 230 provided to surround the battery cells stacked in one direction on the second frame 240. One or more protruding portions 235 and 245 with a stripe shape may be formed on surfaces of the first and second frames 230 and 240.

The protruding portions 235 and 245 may be provided by performing beading on flat surfaces of the first and second frames 230 and 240. The protruding portions 235 and 245 may reinforce the strengths of the first and second frames 230 and 240 without increasing the weights or volumes of the first and second frames 230 and 240. Thus, it may be possible to improve safety of the small-sized and light battery module. In this embodiment, the protruding portions have a shape of a plurality of straight lines, e.g., continuous and linear segments, formed in parallel to one another. However, the protruding portion may be variously changed depending on the design of the battery module, e.g., discrete portions of linear segments spaced apart from each other, curved lines, etc.

Figure 6:
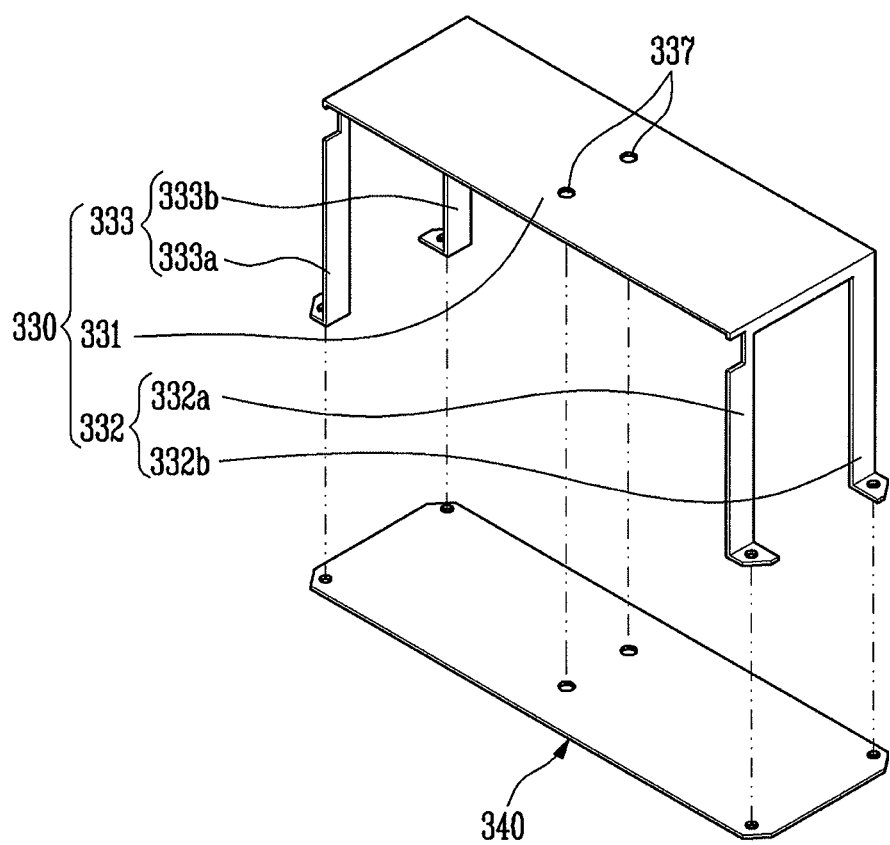
FIG. 6 illustrates a perspective view of first and second frames in a battery module according to still another embodiment.

FIG. 6 is a perspective view of first and second frames in a battery module according to still another embodiment. Referring to FIG. 6, a battery module according to this embodiment may include a second frame 340 and a first frame 330 provided to surround the battery cells. The first frame 330 may include a base portion 331 provided the have a shape corresponding to the second frame 340, and side portions 332 and 333 respectively extended from opposite ends of the base portion 331. The first and second side portions 332 and 333 may include one or more bridges 332a, 332b, 333a and 333b extended from the opposite ends of the base portion 331. The bridges 332a, 332b, 333a and 333b may be spaced apart from one another.

The first and second side portions 332 and 333 according to this embodiment may include first and second bridges 332a, 332b, 333a and 333b, respectively. The first or second bridges 332a and 332b or 333a and 333b may have the shape of two rods spaced apart from each other, and may be respectively extended from both edges at the one or the other end of the base portion 331. The first and second side portions 332 and 333 may be connected to the second frame 240 without any separate process, so as to provide passages for the inflow and discharge of the heat exchanging medium. The passages of the heat exchanging medium may be provided in the state that a portion blocking the flow of a fluid is minimized, so that the heat exchanging efficiency may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A battery module, comprising:
   first and second plates opposite each other;
   first and second frames connecting the first and second plates to define a casing, the first frame being connected to the second frame and having a shape corresponding to the second frame, the first frame including a base portion having a shape corresponding to the second frame, and first and second side portions extending from opposite ends of the base portion toward the second frame, the first and second side portions of the first frame being fastened to the second frame;
   a plurality of battery cells stacked in the casing, the plurality of battery cells being stacked on top of each other to define a plurality of cell arrays in the casing, each battery cell including:
      a first surface with a terminal portion, the first surface of each battery cell facing the first plate,
      a second surface opposite the first surface, and
      a pair of third surfaces spaced part from each other, each third surface connecting the first and second surfaces and being parallel to the second frame; and
   a support member between adjacent cell arrays of the plurality of cell arrays in a direction from the first side portion to the second side portion, the support member arranged perpendicular to the first and second plates, the support member contacting the first and second frames, and the support member being fastened to each of the first and second frames by separate fastening members.

2. The battery module as claimed in claim 1, wherein the adjacent cell arrays are parallel to each other.

3. The battery module as claimed in claim 2, wherein the adjacent cell arrays have equal heights.

4. The battery module as claimed in claim 1, wherein:
the support member includes first and second fastening portions in portions contacting the first and second frames, respectively, and
the first and second frames includes third and fourth fastening portions, respectively, the third and fourth fastening portions being fastened to the first and second fastening portions, respectively, by the separate fastening members.

5. The battery module as claimed in claim 1, wherein the first plate includes at least one terminal through-hole overlapping at least a portion of the terminal portion of the battery cell.

6. The battery module as claimed in claim 5, wherein the terminal portion includes negative and positive electrode terminals, adjacent electrode terminals extending through the through-holes and being electrically connected to each other by a bus-bar.

7. The battery module as claimed in claim 1, wherein the first and second side portions are orthogonal to the first and second plates.

8. The battery module as claimed in claim 7, wherein at least one of the first and second frames includes a plurality of protruding portions, the protruding portions having a stripe shape.

9. The battery module as claimed in claim 7, wherein each of the first and second side portions of the first frame includes a bending portion at a terminal edge thereof, each bending portion being bent with respect to a respective side portion and being fastened to the second frame.

10. The battery module as claimed in claim 7, wherein at least one of the first and second side portions includes at least two bridges extending from an edge of the base portion toward the second frame, the bridges being spaced part from each other.

11. The battery module as claimed in claim 7, wherein at least one of the first and second side portions has a plate shape with an opening therein.

12. The battery module as claimed in claim 11, wherein the opening portion has two or more holes spaced apart from each other along a direction between the first and second frames.

13. The battery module as claimed in claim 12, further comprising a barrier between the stacked battery cells, the opening portion overlapping the barrier.

14. The battery module as claimed in claim 1, wherein the first frame has a cross-section of "Π".

15. The battery module as claimed in claim 7, wherein:
the plurality of cell arrays is arranged adjacent to each other in the direction from the first side portion to the second side portion, and
the support member separates adjacent cell arrays.

16. The battery module as claimed in claim 15, wherein an entirety of each cell array is between the support member and the first side portion or the second side portion.

17. The battery module as claimed in claim 16, wherein the support member includes a non-conductive material.

18. The battery module as claimed in claim 1, wherein the first and second side portions are fastened to the second frame by bolts.

19. The battery module as claimed in claim 9, wherein each bending portion includes one or more holes through which fastening members pass to fasten each of the first and second side portions to the second frame.

\* \* \* \* \*